No. 896,333. PATENTED AUG. 18, 1908.
A. P. SMITH.
CONNECTING BRANCH SLEEVE.
APPLICATION FILED JUNE 18, 1904.
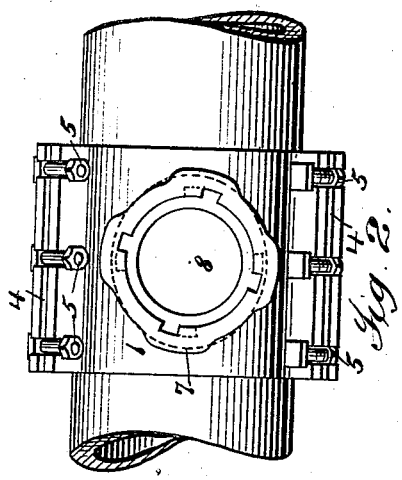
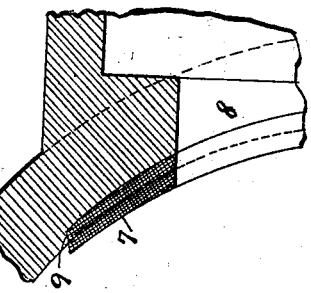
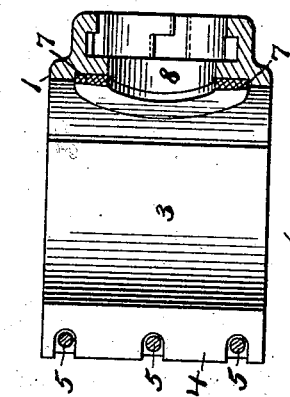
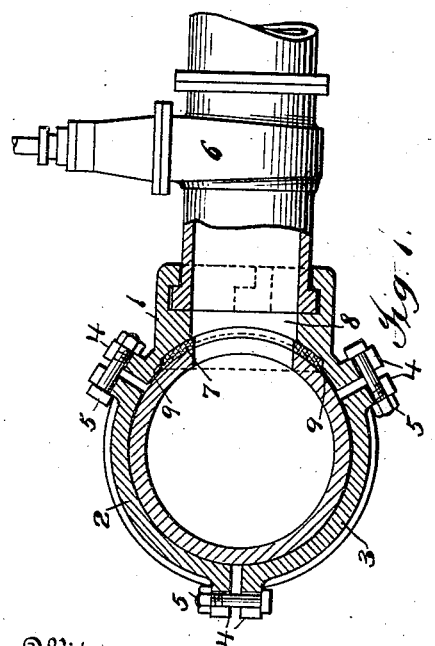
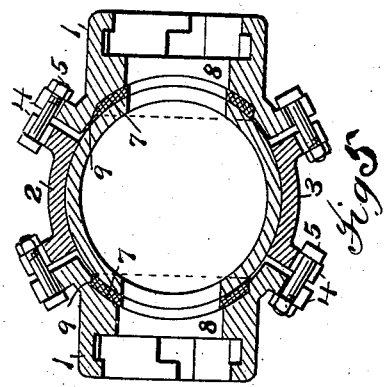
Witnesses
W. H. Kennedy
J. A. Graves
Inventor
Anthony P. Smith
By his Attorneys

UNITED STATES PATENT OFFICE.

ANTHONY P. SMITH, OF NEWARK, NEW JERSEY.

CONNECTING BRANCH SLEEVE.

No. 896,333.  Specification of Letters Patent.  Patented Aug. 18, 1908.

Application filed June 18, 1904. Serial No. 213,094.

*To all whom it may concern:*

Be it known that I, ANTHONY P. SMITH, a citizen of the United States, residing at Newark, county of Essex, and State of New Jersey, have invented certain new and useful Improvements in Connecting Branch Sleeves, fully described and represented in the following specification and the accompanying drawings, forming a part of the same.

This invention relates to improvements in split sleeves for use in making connections with water, gas, oil, steam and other mains under pressure. These split sleeves, as usually constructed, consist of two members adapted to inclose a main and provided with flanges by which they may be secured together in position about the main. One of these members is usually termed the back and the other the front or hub member, and this latter member is provided in its hub with an opening of approximately the size of the opening to be tapped in the main, with which opening in the main such opening in the hub registers. At its outer end this hub member is usually provided with a flange or is otherwise shaped, in order to adapt it for connection with a valve casing. In attaching these sleeves to a main the space between the inner surface of the sleeve and the outer surface of the main must be packed to prevent leakage, the packing ordinarily employed being lead, or sulfur and sand, which, while in a molten state, is poured into this space. In order to economize in the amount of packing material used in this space, it is necessary that the outer surface of the main and inner surface of the sleeve should approach each other as closely as possible, leaving, however, a sufficient space between them to permit the packing material to flow easily. A further reason for this close proximity between the inner surface of the sleeve and the outer surface of the main is that it is necessary to provide a substantially rigid bearing or engagement between the two surfaces so as to prevent movement of one relatively to the other because of the constantly varying pressures in the main, which relative movement, when it does take place, in time results in such a compression of the packing as to cause leakage. Heretofore it has been necessary, in order to secure this close proximity of the inner surface of the sleeve and outer surface of the main, for water-works and other companies to keep on hand sleeves of different internal diameters so as to accommodate mains varying in external diameter.

It is the object of the present invention to improve the construction of these split sleeves in such way as to render it unnecessary for water-works companies or others to keep on hand such sleeves of different internal diameters and to provide a sleeve so constructed that it may be applied to mains of any of the usual diameters and adjusted and secured thereon so as to bring its inner surface into the close proximity to the outer surface of the main required so as to economize in the amount of packing employed between the two surfaces and secure such compression of the packing as will insure against leakage and also furnish the substantially rigid bearing or engagement between the sleeve and main to prevent movement of one relatively to the other on account of variations in pressure in the main.

As a full understanding of the improvements of the present invention can best be had from a detailed description of an organization embodying the same, such description will now be given in connection with the accompanying drawings in which Figure 1 is a transverse section of a main provided with a split sleeve embodying the improvements of the present invention, the front or hub member of the sleeve being shown connected with a valve casing. Fig. 2 is a side elevation of the sleeve and main of Fig. 1, with the valve casing removed. Fig. 3 is a view showing the front or hub member of the sleeve in section and one of the back members in inside elevation. Fig. 4 is an enlarged sectional view of a portion of the same which will be hereinafter referred to; and Fig. 5 illustrates a modification hereinafter referred to.

Heretofore, as above stated, split sleeves for making connections with mains under pressure have, as commonly constructed, consisted of two members and because of this construction it has been necessary to have several sets of such sleeves to provide for mains of different external diameters. In the present case, however, such split sleeves are, as shown in the drawings, made up of a front or hub section 1 and a plurality (preferably two) of other sections 2, 3, which may be termed the back members of the sleeve. Each of these sections 1, 2, 3 is provided at each end circumferentially of the main with a flange 4 so that when the several sections are placed about a main they may, as shown in Fig. 1, be adjusted and secured in position thereon by bolts 5 passing through suitable openings in said sections. When the bolts have been securely adjusted upon the flanges they may, and preferably will, be covered with hot asphalt or other suitable material to prevent corrosion. Where the sleeve, as has heretofore been the custom, is made up simply of two sections, several sets of sleeves varying in internal diameter are necessary to accommodate mains differing in external diameter, but I have discovered that if the split sleeve be made up of three or more such sections it will be unnecessary to carry different sets of sleeves for mains varying in external diameter, as such a sleeve made up of three or more sections may be properly adjusted and secured in position upon mains no matter how they may vary in external diameter within the usual limits.

The hub member 1 to which the valve casing 6 is connected by a bayonet joint, or otherwise, is adapted for the reception and retention of an annular packing 7 of lead or other suitable material inclosing the opening 8 in said hub member. For this purpose there is provided in the hub or front member 1 of the split sleeve for the reception and retention of the packing 7 a recess 9 formed in the inner face of the hub member 1, and when said hub member is secured to the main and the several sections 1, 2, 3 of the split sleeve are secured in position upon the main, such packing will be compressed between the hub member 1 and the main and thus prevent leakage between said hub member and main. The packing or gasket 7 will be of greater thickness at its inner edge than at its outer edge and the recess 9 for such packing or gasket in the inner face of the hub 1 will also be of slightly less depth at its outer edge than at its inner edge, so that the pressure of the main when exerted against the packing or gasket 7 will have a tendency to crowd su h packing into the recess and between the main and the hub member 1, thereby tightly compressing it in such recess and avoiding any possibility of leakage.

In Fig. 5 I have illustrated a modified construction of sleeve differing from that just described in that it is provided with two hub members or sections 1 and in that the sections 2, 3, between these two members, are of less width circumferentially of the main than the sections 2, 3 of the construction illustrated in the preceding figures.

What I claim is:—

1. A split sleeve for making connections to mains comprising a hub member provided with an opening and a plurality of other members adapted to be secured to said hub member and arranged circumferentially of the main and to be adjusted relatively thereto for mains of different diameters, said hub member being provided with a recess surrounding the opening through said hub member and deepest at its inner edge and containing a packing or gasket which is thicker at its inner edge than at its outer edge, substantially as described.

2. A split sleeve for making connections to mains comprising a hub member provided with an opening and a plurality of other members adapted to be secured to said hub member and arranged circumferentially of the main and to be adjusted relatively to the hub member for mains of different diameters, said hub member being provided with a recess surrounding the opening through said hub member for the reception and retention of a packing or gasket, said recess being deepest at its inner edge, substantially as described.

In testimony whereof, I have hereunto set my hand, in the presence of two subscribing witnesses.

ANTHONY P. SMITH.

Witnesses:
  T. F. KEHOE,
  G. M. BORST.